United States Patent
Herrmann et al.

(10) Patent No.: US 8,841,565 B2
(45) Date of Patent: Sep. 23, 2014

(54) MULTIFINGERED SCALE

(75) Inventors: Jürgen Herrmann, Rosenheim (DE); Jan Peter Hecktor, Weitersburg (DE)

(73) Assignee: KHS GmbH, Dortmund (DE)

( * ) Notice: Subject to any disclaimer, the term of this patent is extended or adjusted under 35 U.S.C. 154(b) by 899 days.

(21) Appl. No.: 13/056,252

(22) PCT Filed: Aug. 27, 2009

(86) PCT No.: PCT/EP2009/006199
§ 371 (c)(1),
(2), (4) Date: Jan. 27, 2011

(87) PCT Pub. No.: WO2010/034388
PCT Pub. Date: Apr. 1, 2010

(65) Prior Publication Data
US 2011/0126940 A1 Jun. 2, 2011

(30) Foreign Application Priority Data
Sep. 24, 2008 (DE) .......................... 10 2008 048 774

(51) Int. Cl.
*G01G 13/00* (2006.01)
*G01G 23/37* (2006.01)
*B67C 3/20* (2006.01)
*G01G 15/00* (2006.01)
*B67C 3/28* (2006.01)
*G01G 17/00* (2006.01)

(52) U.S. Cl.
CPC ............ *B67C 3/202* (2013.01); *G01G 23/3728* (2013.01); *G01G 15/00* (2013.01); *B67C 3/287* (2013.01); *G01G 17/00* (2013.01); *Y10S 198/959* (2013.01)
USPC .................. 177/53; 177/60; 141/83; 198/959

(58) Field of Classification Search
CPC ............................................ G01G 11/00–11/20
USPC ......... 141/83; 198/340–341.09, 502.1–502.4, 198/959; 177/53, 54, 60
See application file for complete search history.

(56) References Cited

U.S. PATENT DOCUMENTS

| 3,070,214 | A | * | 12/1962 | Del Rosso | .................... 177/145 |
| 3,198,271 | A | | 8/1965 | Good | |
| 3,439,761 | A | * | 4/1969 | Laimins | ........................ 177/211 |
| 3,561,553 | A | * | 2/1971 | Blubaugh | .................... 177/168 |
| 4,238,027 | A | * | 12/1980 | Oelte | .............................. 177/50 |

(Continued)

FOREIGN PATENT DOCUMENTS

DE         103 01 844      8/2004
DE    10 2005 006733 A1      8/2006

(Continued)

*Primary Examiner* — Timothy L Maust
(74) *Attorney, Agent, or Firm* — Occhiuti & Rohlicek LLP

(57) ABSTRACT

A filling system for containers that are supplied to a filling device via a supplying device and that are removed from the filling device via a removal device, said filling system includes a measuring device for weighing the filled containers. The measuring device is formed by circulating measuring sensors that convey containers from an inlet side to an outlet while concurrently weighing the containers, and circulating synchronously with the container flow. The measuring sensors are oriented at right angles to a direction along a horizontal belt along which the containers are conveyed. Each one has measuring fingers that collectively form a multi-fingered measuring device.

13 Claims, 3 Drawing Sheets

(56) References Cited

U.S. PATENT DOCUMENTS

| | | | |
|---|---|---|---|
| 4,437,561 A * | 3/1984 | Hasegawa et al. | 177/145 |
| 4,682,664 A * | 7/1987 | Kemp | 177/16 |
| 5,285,019 A * | 2/1994 | Kempf et al. | 177/16 |
| RE34,839 E * | 1/1995 | Tolson | 177/5 |
| 6,396,002 B1 * | 5/2002 | Hove et al. | 177/50 |
| 6,693,244 B2 * | 2/2004 | Johnson et al. | 177/126 |
| 6,964,550 B2 * | 11/2005 | Hafner | 414/21 |
| 7,086,591 B2 * | 8/2006 | Anderson | 235/384 |
| 7,325,578 B2 * | 2/2008 | De Antoni Migliorati et al. | 141/83 |
| 8,016,538 B2 * | 9/2011 | Monti | 414/222.13 |
| 8,106,314 B2 * | 1/2012 | Klauer | 177/25.13 |
| 8,556,687 B2 * | 10/2013 | Meyrahn et al. | 452/31 |
| 2005/0256774 A1 * | 11/2005 | Clothier et al. | 705/15 |
| 2009/0255736 A1 * | 10/2009 | Naito et al. | 177/52 |
| 2010/0147598 A1 * | 6/2010 | Klauer | 177/25.13 |
| 2011/0114395 A1 * | 5/2011 | Naiki et al. | 177/52 |
| 2012/0111644 A1 * | 5/2012 | Li | 177/52 |

FOREIGN PATENT DOCUMENTS

| | | |
|---|---|---|
| EP | 0 636 574 A1 | 2/1995 |
| EP | 1 111 352 A1 | 6/2001 |
| GB | 1271085 | 4/1972 |
| WO | 94/20365 A1 | 9/1994 |

* cited by examiner

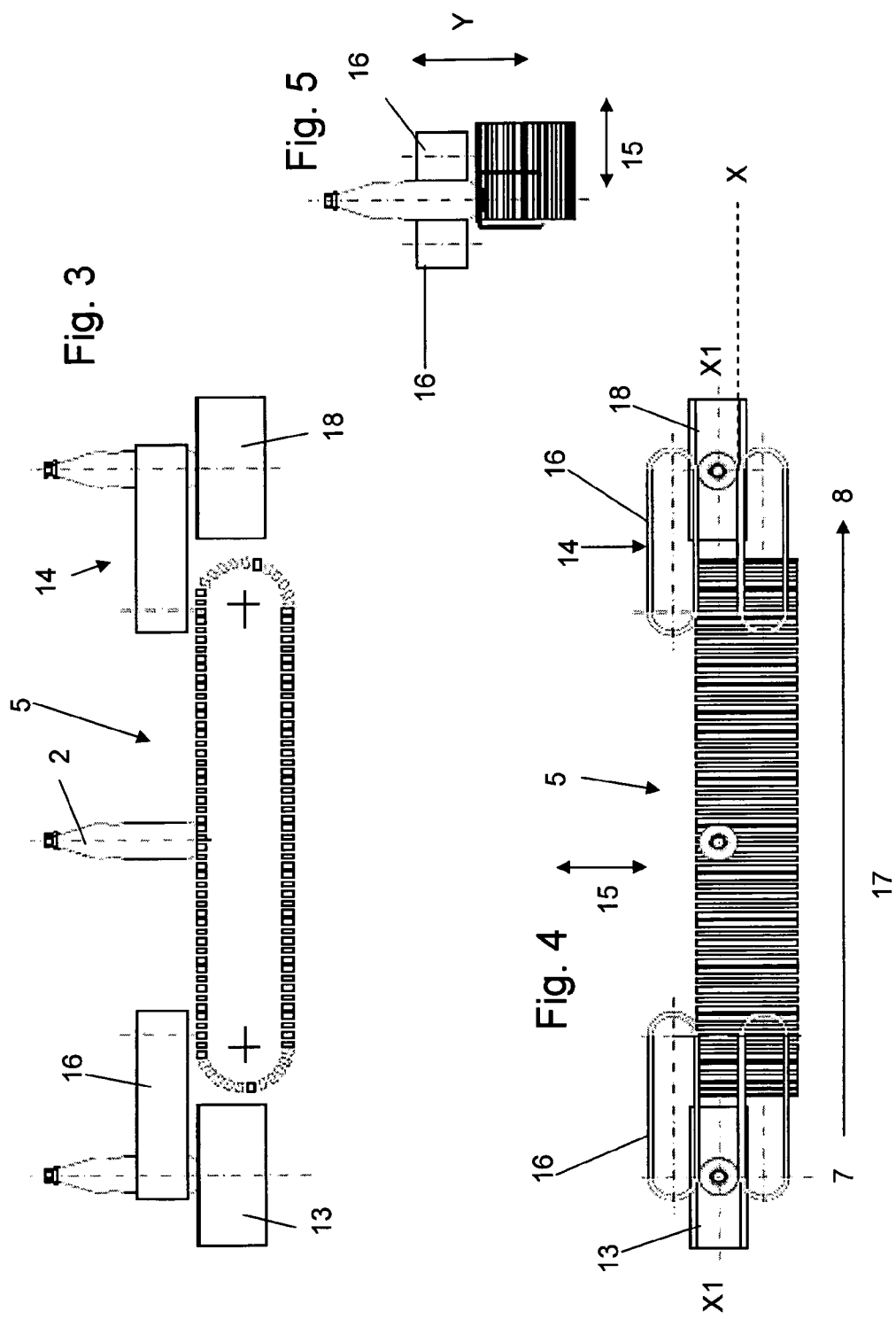

MULTIFINGERED SCALE

CROSS-REFERENCE TO RELATED APPLICATIONS

This application is the National Stage of International Application No. PCT/EP2009/006199, filed on Aug. 27, 2009, which claims the priority of German Patent Application No. 10 2008 048 774.0, filed on Sep. 24, 2008. The contents of both applications are hereby incorporated by reference in their entirety.

FIELD OF INVENTION

The invention relates to container processing, and in particular, to filling and weighing containers.

BACKGROUND

Containers, such as bottles, are often used to contain liquid, for example beverages. The containers can be produced from a transparent or translucent material, for example glass or a translucent plastic material, e.g. PET, or also from sheeting. In the course of container processing, containers are supplied to a filling system, in which they are filled with a liquid product, and once filled, closed.

As the containers are being filled, it must be ensured that each container is filled with the necessary quantity of liquid product according to standard default settings, and that the container is not over-filled with an excessive quantity.

Carrying out a fill level check is a known way to ascertain whether the container is filled with the necessary quantity of liquid product. In this case the respective containers run through an inspection device, that illuminates the containers e.g. in the region of their bottle neck, as an example, and records the corresponding data, e.g. by means of a CCD camera. In an evaluation-and-control unit the actual data recorded is compared with required data such that under-filled or over-filled containers can be separated out. It is important also that this inspection not be carried out in a random manner, but that each container be correspondingly checked. Sensor arrangements with transmitters and receivers are also known in connection with this application.

It is also known, for example, that carbonated liquid products are foamed up in order, once air has successfully been displaced from the container head space, to achieve closing of the containers. This avoids impairment of the liquid product by oxygen inside the closed containers. It is naturally conceivable that liquid products that have not undergone any particular foaming-up procedure are also subject to the formation of foam.

A difficulty that arises is that the foam can confuse an optical sensor. As a result, under-filled or over-filled containers could be deemed to have the correct fill level even though they do not. The converse error is also possible. In some cases, correctly filled containers are rejected. In addition, the containers, for example bottles, are subject to certain shape tolerances such that could also result in an unreliable inspection result.

One way to avoid these difficulties is to weigh the filled containers. To do this, the individual containers are removed from the container flow and weighed, one at a time, by a separate holding device. Once the specific weight of the liquid product and the weight of the empty container are known, it is possible to deduce the filled weight. If the weight is too high or too low, the container is separated out.

The main disadvantage with this approach is the need to interrupt container flow to weigh the containers one-by-one. This is a significant disadvantage in modern filling systems that nowadays have throughput on the order of 60,000 containers per hour. Any interruption in the container flow results in considerable time losses and consequently in economic losses.

DE 103 01 844 A1 discloses a filling machine that relies on weighing. The described apparatus initially weighs the empty containers. After filling them, it weighs them again. To achieve this, the supplying conveyor comprises two parts, between which scales are located. The containers are moved from the first part of the supplying conveyor onto the scales by suitable means that are not actually explained in detail. As described above, the containers are certainly raised by means of a holding device and placed onto the scales in order, after weighing, to transfer the containers in the very same manner to the second part of the supplying conveyor. However, this certainly interrupts the container flow. The weighed empty containers are filled by means of filling devices and are then removed by way of a removal conveyor. The removal conveyor, analogous to the supplying conveyor, is formed by two parts, between which a second set of scales is located for weighing the filled containers. In this case too, it appears that the respective container is moved to the scales by means of separate holding devices, and is then removed again. This interrupts container flow yet again.

In order to achieve a measurement at a high conveying speed without interrupting container flow, DE 103 01 844 A1 consequently proposes that individual containers be transferred out of the container flow. The transferred-out containers are supplied to a measuring point located next to the removal conveyor. This means, however, that it is no longer possible to check the fill quantity of each container in a continuous manner. Instead, fill quantity is checked in a random manner.

SUMMARY

Consequently, it is the object of the invention to improve a filling system or a measuring device of the aforementioned type with simple means such that each container can be subject to a fill quantity check without interrupting the container flow. This enables acquisition of reliable measurement data regardless of foam formation or container tolerances.

In one aspect, the invention features a filling system for containers that are supplied to a filling device via a supplying device and that are removed from a filling device via a removal device, wherein at least one measuring device is provided at least for weighing the filled containers. However, the invention also relates to a measuring device at least for weighing filled containers.

In one aspect, the invention features at least one measuring device formed by a plurality of circulating measuring sensors on which the containers, standing on their bottom side, are conveyed from an inlet side to an outlet side and are at the same time weighed, and wherein the measuring sensors circulate synchronously with the container flow.

The invention makes available a continuous check on the fill quantity of each container without having to put the containers into singles and without having to hold them with a separate holding element. Instead, there is a measuring device that can weigh the respective containers at a rate that is preferably identical to that of the container flow, wit- any possible foam forming process and container tolerances not influencing the measuring result. In addition, a plurality of containers can be weighed at the same time by way of the weighing device, with a reliable measuring result being obtained for each container.

In an advantageous manner, the containers can be transferred from the removal device, or from a continuous conveyor connected downstream of the removal device, to the measuring device at a speed that is preferably identical to that of the container flow. The measuring device conveys the containers at the corresponding speed from the inlet side to the outlet side. At the outlet side, the containers are then transferred at the corresponding speed to a conveyor connected downstream, which is preferably a continuous conveyor.

In one embodiment, the measuring sensors are located at right angles to the conveying direction, and, when viewed in the conveying direction, are spaced apart from each other. The measuring sensors can be adapted to the width of the standing surface, or container bottom when viewed in the conveying direction such that only one container stands upright on a measuring sensor at a time. However, to enable the filling system to fill different containers, it is preferable for the measuring sensors to be narrow bars with preferably a flat standing surface such that one container stands upright over several measuring sensors. In this case it would be favorable if the standing surface of the container, or its bottom, were not interrupted at least when viewed in the circumferential direction.

In some embodiments, the measuring sensors are measuring fingers that form a quasi multi-fingered measuring device, the individual measuring fingers being spaced apart such that a quasi conveyor belt is formed with an upper belt and a lower belt.

However, in other embodiments, the measuring sensors rotate horizontally, for example, in the form of a horizontally positioned oval carousel.

In order to record the weight of the standing container, it is preferable that the measuring sensors be provided with, or connected to, measuring elements that are able to provide information indicative of a load. Such measuring elements include those that detect a bending, a strain, or a force in the longitudinal axis, at right angles to the conveying direction, or a comparable signal of the measuring sensors or of the individual measuring fingers. These types of measuring elements can include pressure sensors or strain gauges.

In other embodiments, a measuring element is located at each measuring sensor such that the weight of the container standing upright over several measuring sensors can be recorded and can be associated with that container. This is advantageous because the containers would then not have to be transferred at a predetermined spacing to the measuring device, but could instead just be conveyed and weighed while they are spaced apart in a minimally unordered manner.

An alternative embodiment records the load, which can be derived from deflection or bending of the measuring sensors, using a stationary, i.e. non-circulating, measuring element. In this case, there is no need to record the load on the individual fingers. The deflection or bending of resilient measuring sensors, for example, can be recorded by an individual stationary measuring element that is located in the direct vicinity of the circulating measuring sensors.

In other embodiments, the measuring elements is connected to an evaluation unit that detects incorrectly filled containers. To achieve this, data relating to how much liquid product should go into each of several container types is stored in the evaluation unit. This permits comparison with the recorded actual data and thus provides a reliable basis upon which to decide whether a container is incorrectly filled.

If the evaluation unit detects an incorrectly filled container, a corresponding signal is sent to a separating-out device. The separating-out device removes or separates the corresponding container from the container flow. The separating-out device can be connected downstream of the measuring device.

In another embodiment, containers are separated out while they are still on the measuring device. Such an embodiment can be implemented by mounting the measuring sensors so as to be deflectable or displaceable at right angles to the conveying direction such that the relevant container can be separated out of the container flow by displacing the corresponding measuring sensor. When necessary, the evaluation unit sends a corresponding signal preferably to a control device, which in turn brings about a displacing or deflecting of the relevant measuring sensor.

The rejected container in this case is initially forwarded in the conveying direction before being removed on the outlet side. This removal is carried out by a corresponding separating-out device, e.g. developed as a removal element, located on the outlet side.

In some embodiments, a guide element on the input side ensures that containers are conveyed standing upright in a straight line on the measuring device. The guide element, in a preferred embodiment, has two guide jaws spaced apart in the transverse direction of the measuring device. The guide jaws are spaced apart so as to avoid having containers be conveyed side-by-side in the transverse direction of the measuring device.

The guide jaws can also be adjustable. This enables the guide jaws to adapt to different kinds of containers. In some embodiments, a similar guide element is located on the outlet side. This outlet-side guide element removes rejected containers.

In some embodiments, another measuring device records the empty weight of the containers before they are filled. The second measuring device is typically associated with the supplying device or with a continuous conveyor connected upstream of the supplying device. The empty weight measured by the second measuring device is stored in the evaluation unit. When the same container, but now filled, reaches the measuring device associated with the outlet side, its total weight is recorded. By simply comparing the two recorded weights, the evaluation unit is able to detect the precise fill volume. The measuring device can also include at least one guide element.

In some embodiments, the fill system is a linear system with linear conveyor system. In others, the fill system is a rotating system.

In the case of a rotating fill system, a supplying star, a filling star, and a removal star are provided. The containers are supplied to the supplying star via a continuous conveyor, it being possible for such a continuous conveyor to also be associated with the removal star. The respective measuring devices can preferably be associated with the respective continuous conveyor.

Obviously the measuring device is not to be restricted to use in a filling system.

In another aspect, the invention features an apparatus having a filling system for containers that are supplied to a filling device via a supplying device and that are removed from the filling device via a removal device. The filling system includes a multi-fingered measuring device for weighing the filled containers. The multi-fingered measuring device is formed by circulating measuring sensors that convey containers, standing upright on their bottom side, on a horizontally arranged conveyor belt that has an upper belt and a lower belt, from an inlet side to an outlet side. While doing so, it concurrently weighs the containers. The measuring sensors circulate synchronously with the container flow and are oriented at right angles to a direction along which the containers are conveyed. The measuring sensors comprise measuring fingers that collectively form the multi-fingered measuring device.

In some embodiments, the measuring device is controllable such that the containers are transferred from the removal device, or from a continuous conveyor connected downstream from the removal device, to the measuring device at the identical speed as the container flow. As a result, the measuring device conveys the containers from the inlet side to the outlet side at the speed corresponding to the container flow.

In other embodiments, the measuring sensors comprise bars with a flat standing surface.

In yet other embodiments, the measuring sensors comprise or connect to measuring elements. In some of these embodiments, the measuring elements comprise a pressure sensor, and in others, the measuring elements comprise a strain gauge.

Further embodiments also include a stationary measuring element that detects a load on the measuring sensors.

In additional embodiments, the measuring sensors are mounted to be displaceable at right angles to a direction along which containers are conveyed.

In yet other embodiments, the measuring device comprises a guide element at least on the inlet side. Among these are embodiments in which the guide element comprises two guide jaws spaced apart along a transverse direction transverse to a direction along which the containers are conveyed.

Other embodiments further comprise means for filling the containers; means for supplying containers to the means for filling the containers; and means for removing the containers from the means for filling the containers.

Also included within the invention's scope are embodiments in which supplying device or a continuous conveyor connected upstream thereof comprises a further measuring device associated therewith for weighing an empty container.

In another aspect, the invention features an apparatus comprising a multi-fingered measuring device for weighing containers conveyed by a filling system that supplies containers to a filling device via a supplying device and that removes the containers from the filling device via a removal device. Such a multi-fingered measuring device has circulating measuring sensors that transport the containers, standing upright on their bottom side, on a horizontally-arranged conveyor belt having an upper belt and a lower belt, from an inlet side to an outlet side while concurrently weighing the containers, wherein the measuring sensors circulate synchronously with a container flow of a conveyor. The measuring sensors are oriented at right angles to a direction along which the containers are conveyed, and include measuring fingers that collectively form the multi-fingered measuring device.

BRIEF DESCRIPTION OF THE FIGURES

Further advantageous developments of the invention are disclosed in the sub claims and the following description of the Figures, in which:

FIG. 3 shows a side view of the measuring device in FIG. 1,

FIG. 4 shows a top view of the measuring device in FIG. 1 and

FIG. 5 shows a front view of the measuring device in FIG. 1.

Identical parts in the different figures are always provided with the same references, which is why, as a rule, they are only described once.

DETAILED DESCRIPTION

Figure 1:
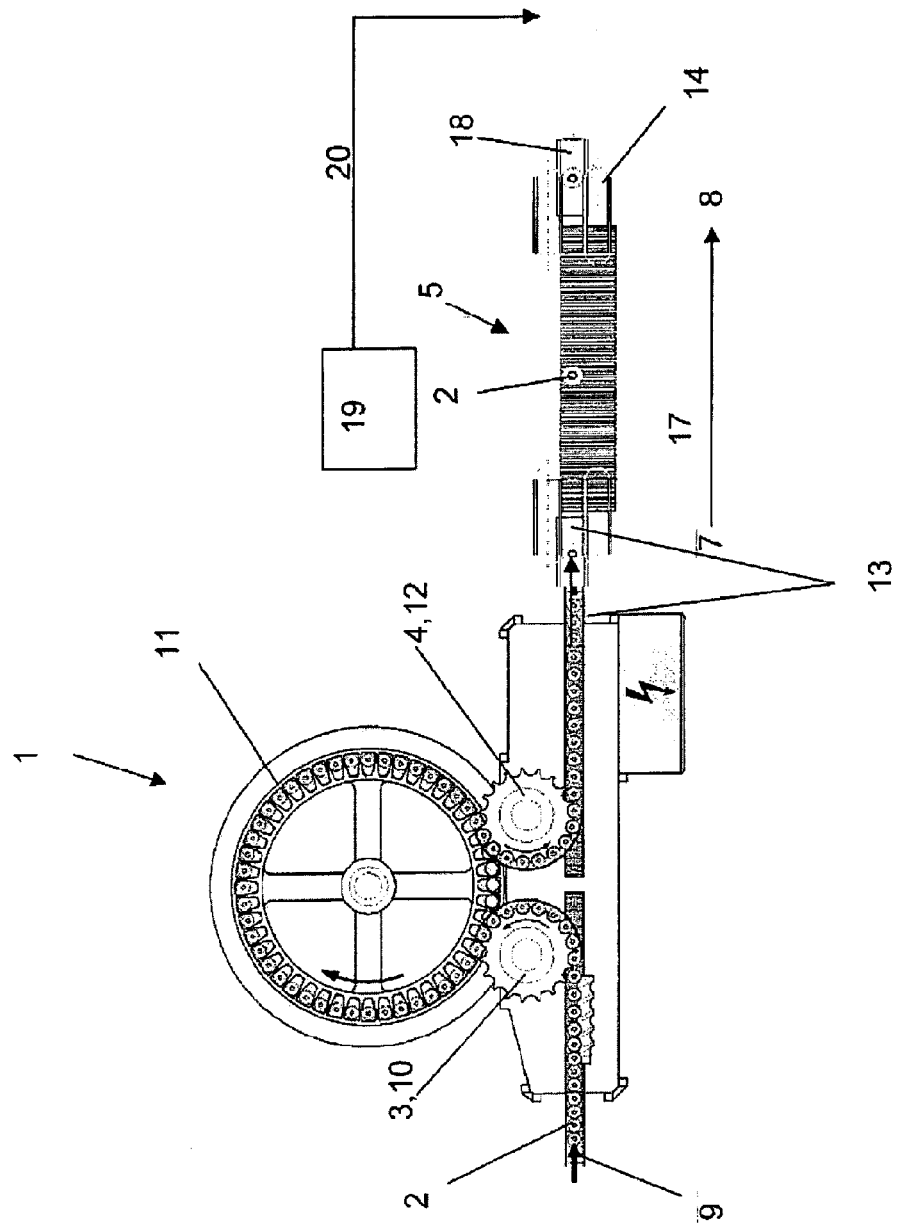
FIG. 1 shows a basic view of a filling system with a measuring device.
Figure 2:
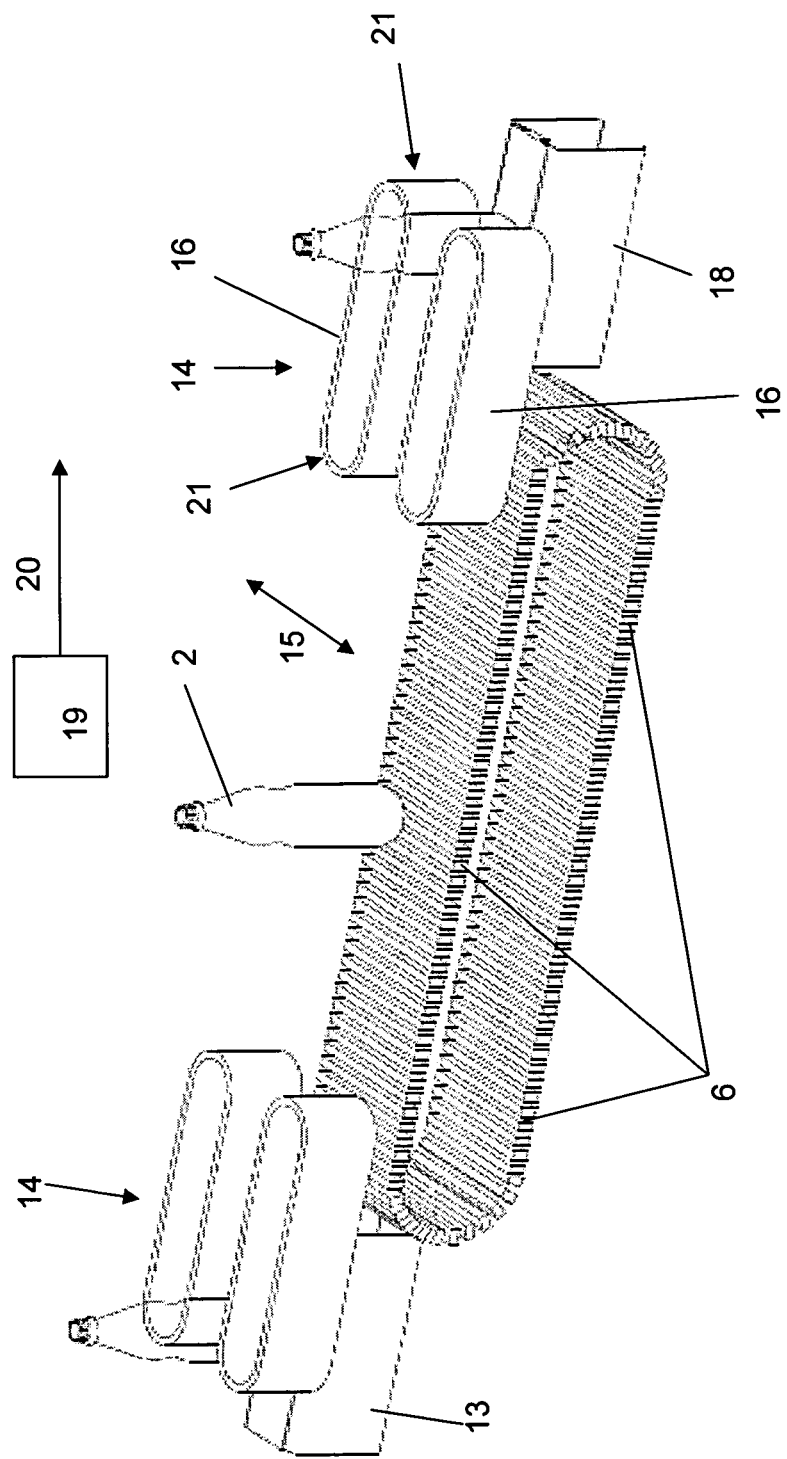
FIG. 2 shows a perspective view of the measuring device in FIG. 1.

FIG. 1 shows a filling system 1 for containers 2 that are supplied to a filling device via a supplying device 3 and are removed from a filling device via a removal device 4. Measuring sensors 6, best seen in FIG. 2, circulate synchronously with container flow. These sensors 6 form a measuring device 5 for weighing filled containers 2. The sensors 6 convey containers 2, which stand upright on the sensors 6 on their bottom side, from an inlet side 7 to an outlet side 8. At the same time, the sensors 6 weigh the containers 2.

The filling system 1 is a rotating one in which containers 2 are supplied to the supplying device 3 via a continuous conveyor 9. In the illustrated embodiment, the supplying device 3 is an inlet star 10. The inlet star 10 transfers the containers 2 to a filling star 11 at which a filling device is located. The filled containers 2 pass into the removal device 4, which in the illustrated embodiment, is a removal star 12. From there, they continue onto a continuous conveyor 13.

As represented as an example, the measuring device 5 is associated with the continuous conveyor 13, which is connected downstream of the removal device 4. To give a general overview, only a few individual containers 2 are shown standing upright on the measuring device 5. In actual operation, a plurality of containers 2 will stand on the measuring device 5 spaced apart in an unordered manner. In addition, the measuring device 5 connects directly to the continuous conveyor 13. In general, the continuous conveyor 13 has dimensions other than those represented.

In some embodiments, the containers 2 are either glass or plastic bottles, preferably with a bottom that is not interrupted in the circumferential direction or with a flat standing surface in the circumferential direction on the bottom side.

The measuring device 5 has guide elements 14 on the inlet side and on the outlet side. These guide elements 14 are located laterally offset with reference to a central axis X, as shown in FIG. 4.

The respective guide elements 14 include guide jaws 16 that are spaced apart in a transverse direction 15. The spacing between the guide jaws 16 is adapted to a diameter of the containers 2 such that the respective containers 2, when viewed in a direction of conveying direction, i.e. the direction of the arrow 17 in FIG. 4, are conveyed to the measuring device 6 arranged one behind the other in a straight line. The line of conveying is represented by means of the broken line X1.

It is conceivable to realize the guide jaws 16 so that they are adjustable in the transverse direction 15 such that they can then be adjusted to accommodate containres having different diameters. This feature enables one fill system to fill different container types. Preferably, containers of the same type are filled in series.

In the exemplary embodiment represented in FIG. 4, the top guide jaw 16, in each case in the drawing plane, is located completely to the side of the measuring sensors 6.

FIG. 5 shows that there is a gap between the guide jaws 16 and the standing surfaces of the measuring sensors 6 in the vertical direction Y. The guide element 14 on the inlet side prevents containers, when viewed in the transverse direction 15, from being conveyed side-by-side on the measuring device 5. On the outlet side, the guide element 14 brings about a transfer of the containers one behind another to a continuous conveyor 18 that is connected downstream.

In addition, the guide elements 14 can be used to avoid having the containers 2 fall over when they are transferred from the container flow to the measuring device and from the measuring device 5 to a conveyor connected downstream. In addition, one of the guide jaws 16 of the guide element 14 on the outlet side can also operate as a removal device for removing any containers 2 that are incorrectly filled.

The guide elements 14 are located such that they engage over the respective continuous conveyors 13, 18 and the measuring device 5.

The measuring sensors 6 are oriented at right angles to the conveying direction 17. Preferably, the measuring sensors 6 are narrow bars. As a result, when a container 2 stands upright on its bottom side, its bottom side extends across several measuring sensors 6.

A standing surface of the measuring sensors 6 should be flat. As shown in the particular example of FIG. 2, the container 2 stands upright on its bottom side. In the particular embodiment shown, the container 2 extends across four measuring sensors 6. Larger containers extend across more than four measuring sensors 6 and smaller ones extend across fewer measuring sensors 6.

The measuring device 5, with its plurality of spaced-apart measuring sensors 6, is formed as a quasi conveyor belt with an upper belt and a lower belt. Guiding or driving devices are provided on the inlet side and on the outlet side.

The measuring device 5, or the individual measuring sensors 6 in this case, preferably circulate at the same speed as the container flow. This means that the circulating speed of the individual measuring sensors 6 is adapted to the speed of the continuous conveyor 13, 18 connected upstream or downstream. Naturally, the circulating speed of the measuring device 5 is controllable.

In order to be able to record the weight of the standing containers 2, measuring elements are provided or connected to the measuring sensors 6. These measuring elements (not shown) can detect a load, for example a bending, a deflection, or a force in the longitudinal axis at right angles to the direction of conveying 17 or a comparable signal from the measuring sensors 6 or from the individual measuring fingers. Such measuring elements can be realized, for example, as pressure sensors or as strain gauges.

In some embodiments, one measuring element is arranged at each measuring sensor 6 such that the weight of the container standing upright on more than one measuring sensor 6 is recorded and can be associated with that container.

As an alternative it is also conceivable to record the load (e.g. deflection or bending) on the measuring sensor 6 by way of a stationary (i.e. not circulating) measuring element. In this case, in an advantageous manner, there is no need to record the load on the individual fingers, for example, the deflection or the bending of resilient measuring sensors being recorded by means of one single stationary measuring element.

The measuring elements are preferably connected in a wireless manner to an evaluation unit 19. The evaluation unit 19 stores reference data or required data indicating the quantity to be filled, the type of container, and its weight.

A comparison is carried out using the actual data recorded. This makes it possible to obtain a precise fill volume.

The measuring sensors 6, or the corresponding measuring elements, that are loaded by a container can be connected together such that they transfer their data together to the evaluation unit 19. This makes it possible to determine the weight of the container 23 standing upright.

It is preferable if the combined allocation of the respective measuring sensors 6 or of the respective measuring elements is lifted for one circulation in the lower belt, and is newly allocated again in the upper belt, i.e., if a new container 2 to be weighed stands again on possibly different measuring sensors 6. However, it is also possible to allocate the measuring sensors 6, or the measuring elements, directly corresponding to the product line when the fill system is adjusted, that-is-to-say to split at least the upper belt accordingly; for the measuring device can be adjustable such that in each case the identical measuring sensors 6 are loaded even if the axial spacing between the containers 2 is non-ordered.

In order to be able to weigh an empty container, a measuring device is also associated in a sensible manner with the continuous conveyor 9, the measuring device being preferably realized in an identical manner to the afore-described measuring device 6.

Recorded data, such as the empty weight of the container 2, is supplied to and stored in the evaluation unit 19. The measuring elements of said measuring device can preferably be connected to a receiving unit in a wireless manner, the receiving unit being connectable to the evaluation unit 19 such that the data can be transferred to the evaluation unit. Once the relevant, however filled, container 2 reaches the measuring device 6, its overall weight is recorded, and the corresponding measuring signal is sent to the evaluation unit 19. At the evaluation unit 19, the measuring signal is compared to the stored empty weight of the relevant container 2. As a result, the fill volume is precisely determinable without the result being influenced by container tolerances.

If the evaluation unit 19 then detects a container that has not been correctly filled, a corresponding removal signal is sent to a removal device. The removal device separates the relevant under-filled or over-filled container 2 out of the container flow. The removal device can be connected downstream of the measuring device 6. This is shown symbolically by the arrow 20.

In a continued development, the corresponding containers 2 can be separated out as early as on the measuring device 5. To accomplish this, the measuring sensors 6 are mounted so as to be displaceable or deflectable at right angles to the transport direction such that a container 2 can be separated out of the container flow by a displacement of the corresponding measuring sensors.

In this case, the evaluation unit 19 sends a corresponding signal to a control unit (not shown) that brings about a corresponding displacement of the relevant measuring sensors 6, i.e., of the measuring sensors 6 on which the container that is not correctly filled is standing. The rejected container 2, which is offset to the side of the line X1, is initially conveyed in the transport direction 17 and is removed at the outlet side by a corresponding separating-out device, e.g. developed as a removal element located on the outlet side. The separating-out device sends the relevant containers to a forwarding conveyor.

In the exemplary embodiment in FIG. 4, the relevant measuring sensors 6, with incorrectly-filled containers 2 standing upright thereon, would be displaced downward in the drawing plane and forwarded in the transport direction 17 until they reach the bottom guide jaw 16 in the drawing plane. The guide jaw 16 shown in the bottom drawing plane can therefore, in addition to the abovementioned alignment function, also remove incorrectly filled containers 2. In an advantageous manner, the respective end faces 21 of the respective guide jaws 16 are consequently rounded. The displaced measuring sensors 6 can then be returned into their original position preferably on the bottom belt.

Naturally the inspection results obtained by the measuring device 5 can also be used for re-adjusting the fill devices such that a quasi self-adjustable filling system 1 would be achievable.

| List of reference numerals in the drawings | |
|---|---|
| 1 | Filling system |
| 2 | Container |
| 3 | Supplying device |
| 4 | Removal device |
| 5 | Measuring device |
| 6 | Measuring sensor |
| 7 | Inlet side |
| 8 | Outlet side |
| 9 | Continuous conveyor |
| 10 | Inlet star |
| 11 | Filling star |
| 12 | Outlet star |
| 13 | Continuous conveyor |
| 14 | Guide elements |
| 15 | Transverse direction |
| 16 | Guide jaws |
| 17 | Conveying direction |
| 18 | Continuous conveyor |
| 19 | Evaluation unit |
| 20 | Arrow |
| 21 | End faces |
| X | Central axis |
| X1 | Line of conveying |
| Y | Vertical direction |

Having described the invention, and a preferred embodiment thereof, what is claimed as new, and secured by Letters Patent is:

1. An apparatus comprising a filling system for containers that are supplied to a filling device via a supplying device and that are removed from the filling device via a removal device, said filling system comprising: a multi-fingered measuring device for weighing the filled containers, the multi-fingered measuring device being formed by circulating measuring sensors that convey containers, standing upright on their bottom side, from an inlet side to an outlet side while concurrently weighing the containers, wherein the measuring sensors circulate synchronously with the container flow, wherein said measuring sensors are oriented at right angles to a direction along which said containers are conveyed, wherein said measuring sensors comprise measuring fingers that collectively form said multi-fingered measuring device and a horizontally arranged conveyor belt, wherein said horizontally arranged conveyor belt comprises an upper belt and a lower belt.

2. The apparatus of claim 1, wherein the measuring device is controllable such that the containers are transferred from the removal device, or from a continuous conveyor connected downstream from the removal device, to the measuring device at the identical speed as the container flow, whereby the measuring device conveys the containers from the inlet side to the outlet side at the speed corresponding to the container flow.

3. The apparatus of claim 1, wherein the measuring sensors comprise bars with a flat standing surface.

4. The apparatus of claim 1, wherein the measuring sensors comprise or connect to measuring elements.

5. The apparatus of claim 1, further comprising a stationary measuring element that detects a load on the measuring sensors.

6. The apparatus of claim 1, wherein the measuring sensors are mounted to be displaceable at right angles to a direction along which containers are conveyed.

7. The apparatus of claim 1, wherein the measuring device comprises a guide element at least on the inlet side.

8. The apparatus of claim 1, wherein the supplying device or a continuous conveyor connected upstream thereof comprises a further measuring device associated therewith for weighing an empty container.

9. The apparatus of claim 7, wherein the guide element comprises two guide jaws spaced apart along a transverse direction transverse to a direction along which the containers are conveyed.

10. The apparatus of claim 4, wherein the measuring elements comprise a pressure sensor.

11. The apparatus of claim 4, wherein the measuring elements comprise a strain gauge.

12. An apparatus comprising a multi-fingered measuring device for weighing containers conveyed by a filling system that supplies containers to a filling device via a supplying device and that removes the containers from the filling device via a removal device, the multi-fingered measuring device comprising a plurality of circulating measuring sensors that transport the containers, standing upright on their bottom side, from an inlet side to an outlet side while concurrently weighing the containers, wherein the measuring sensors circulate synchronously with a container flow of a conveyor, wherein said measuring sensors are oriented at right angles to a direction along which said containers are conveyed, and wherein said measuring sensors comprise measuring fingers that collectively form said multi-fingered measuring device, and a horizontally-arranged conveyor belt having an upper belt and a lower belt.

13. The apparatus of claim 12, further comprising: means for filling said containers; means for supplying containers to said means for filling said containers; and means for removing said containers from said means for filling said containers.

* * * * *